United States Patent [19]

Erickson et al.

[11] Patent Number: 5,867,121
[45] Date of Patent: Feb. 2, 1999

[54] RADAR SCAN CONVERTER SYSTEM

[75] Inventors: Fred W. Erickson, Agoura Hills; William F. Smith, Carlsbad, both of Calif.

[73] Assignee: Litton Systems, Inc., Woodland Hills, Calif.

[21] Appl. No.: 843,908

[22] Filed: Apr. 17, 1997

[51] Int. Cl.⁶ ................................................. G01S 7/298
[52] U.S. Cl. ................................................. 342/185; 342/197
[58] Field of Search .................................... 342/185, 176, 342/197

[56] References Cited

U.S. PATENT DOCUMENTS

| | | | |
|---|---|---|---|
| 4,387,365 | 6/1983 | Berry et al. | 340/347 |
| 4,387,370 | 6/1983 | Katagi | 340/727 |
| 4,434,422 | 2/1984 | Kenol et al. | 434/2 X |
| 4,471,349 | 9/1984 | Strolle | 340/727 |
| 4,829,308 | 5/1989 | Tol et al. | 342/185 |
| 4,833,475 | 5/1989 | Pease et al. | 342/185 |
| 4,845,501 | 7/1989 | Pease et al. | 342/185 |
| 4,931,801 | 6/1990 | Hancock | 342/185 |
| 5,049,886 | 9/1991 | Seitz et al. | 342/26 |
| 5,068,665 | 11/1991 | Piazza et al. | 342/177 |
| 5,233,335 | 8/1993 | Berwin | 340/739 |
| 5,315,305 | 5/1994 | Noll | 342/185 |
| 5,341,141 | 8/1994 | Frazier et al. | 342/59 |
| 5,418,535 | 5/1995 | Masucci et al. | 342/185 |
| 5,554,992 | 9/1996 | Toth et al. | 342/185 |

*Primary Examiner*—John B. Sotomayor
*Attorney, Agent, or Firm*—Donald J. Ellingsberg

[57] ABSTRACT

The Radar Scan Converter System (1) receives range and azimuth data generated by a conventional radar as presented in a polar coordinate system, (2) stores this data in associated cell locations in a range/azimuth polar video map, and (3) displays this polar coordinate range/azimuth data in a Cartesian coordinate system, in real time, on a conventional computer monitor having a rectangular display formed by a relatively large number of pixels organized in the Cartesian coordinate system. Each pixel in the display is sequentially update by (1) selecting a respective pixel address, (2) determining the corresponding range/azimuth cell address in the polar video map, (3) reading the video level in this corresponding range/azimuth cell, and (4) in response to this associated video level, either initially loading or subsequently updating the selected pixel. The radar scan converter system displays (1) shades of gray or color, which may represent one or more video levels, and (2) has an image decay capability over repeated radar scans which is particularly suited for display of a moving target.

27 Claims, 5 Drawing Sheets

RADAR SCAN CONVERTER SYSTEM

The specification of this patent discloses material which is the subject of copyright protection. Reproduction of this disclosure material as it appears in this United States Letters Patent is permitted by the copyright owner in furtherance of the United States Patent Laws (Title 35 United States Code). The copyright owner reserves all other rights under the United States Copyright Laws (Title 17 United States Code).

BACKGROUND OF THE INVENTION

1. Field of the Invention

A Radar Scan Converter System that converts range/azimuth data, as received in polar coordinates from a conventional radar, to range/azimuth data, which is implemented in Cartesian coordinates for real time display on a computer workstation monitor.

2. Description of the Related Art

A conventional radio detecting and ranging (hereinafter "radar") system includes an antenna, transmitter, modulator, duplexer switch, receiver, and an indicator or display. As the radar antenna and transmitter move or rotate, the radar transmitter radiates energy pulses or signals that illuminate identified sectors that fan outwardly from the radar transmitter along determinable azimuth and range values. Any object or target in a sector that is illuminated by the transmitter pulse will reflect this pulse back to the radar antenna. This reflected pulse received by the antenna generates a corresponding visible blip or image on a radar display. The radar display functions as a range/azimuth map based on a polar coordinate system. A radius line or trace moves as a fine line of light on the display screen and scans, for example, a 360° compass polar map. The moving trace visually represents to an operator of the radar system the rotation or movement of the antenna as it scans the identifiable sectors of the polar map screen. All reflected signals received by the antenna are "painted" by the moving trace as bright, arc-shaped blips on the radar display. The conventional radar display has a very long persistence phosphor so that the respective blip for an associated stationary object or moving target remains visible for several rotations or scans of the trace. Thus, moving targets leave a visible path or trail of decayed images on the radar display screen. This decay trail makes it easier for the operator to locate or spot a moving target, as well as to estimate the target's direction and speed.

SUMMARY OF THE INVENTION

Briefly, in accordance with the invention, a new and improved Radar Scan Converter System (1) receives range and azimuth data generated by a conventional radar and presented in a polar coordinate system, and (2) stores this data in associated cell locations in a range/azimuth polar video map which is also presented in a polar coordinate system. The radar scan converter system of the invention displays this polar coordinate range/azimuth data in a Cartesian coordinate system, in real time, on a conventional computer monitor. The generally rectangular display screen of the computer monitor has a pixel display formed by a relatively large number of pixels organized in the X- and Y-axes of a Cartesian coordinate system. The radar scan converter system sequentially updates each pixel in the display by (1) selecting a pixel address in the Cartesian coordinate system, (2) determining the corresponding cell address in the range/azimuth polar map, (3) reading the video level in this corresponding cell, and (4) responsive to this respective video level, either initially loading or subsequently updating the associated pixel. The radar scan converter system displays (1) shades of gray or color, which may represent one or more video levels, and (2) has an image decay capability over repeated radar scans which is particularly suited for repeated scans of a moving target.

OBJECTS OF THE INVENTION

Accordingly, it is an object of the invention to provide a new Radar Scan Converter System that can capture and process radar video signals for display by a conventional computer system monitor.

It is an object of the invention to provide a new radar scan converter system that converts a conventional polar radar display to a display of Cartesian or rectangular coordinates on a computer system monitor.

It is an object of the invention to provide a new radar scan converter system that sequentially updates respective pixels of a Cartesian coordinates-display by associated address reference to stored range and azimuth polar coordinates-data generated by a conventional radar.

It is an object of the invention to provide a new radar scan converter system with a Cartesian coordinates-pixel display that exhibits continuous video decay over multiple scans of the radar.

It is an object of the invention to provide a new radar scan converter system that converts analog video signals to digital video signals, and sequentially updates the digital video signals by predetermined reference to associated stored analog video signals.

It is an object of the invention to provide a new radar scan converter system that combines and mixes individual binary video signals with digitized analog video signals.

It is an object of the invention to provide a new radar scan converter system that generates a spokeless digital video display of analog radar objects and targets.

Further objects, features, and the attending advantages of the Radar Scan Converter System of the present invention will be apparent when the following description of the invention is read and understood in view of the drawings.

DESCRIPTION OF THE PREFERRED EMBODIMENT

Radar Scan Converter System 10

Figure 1:
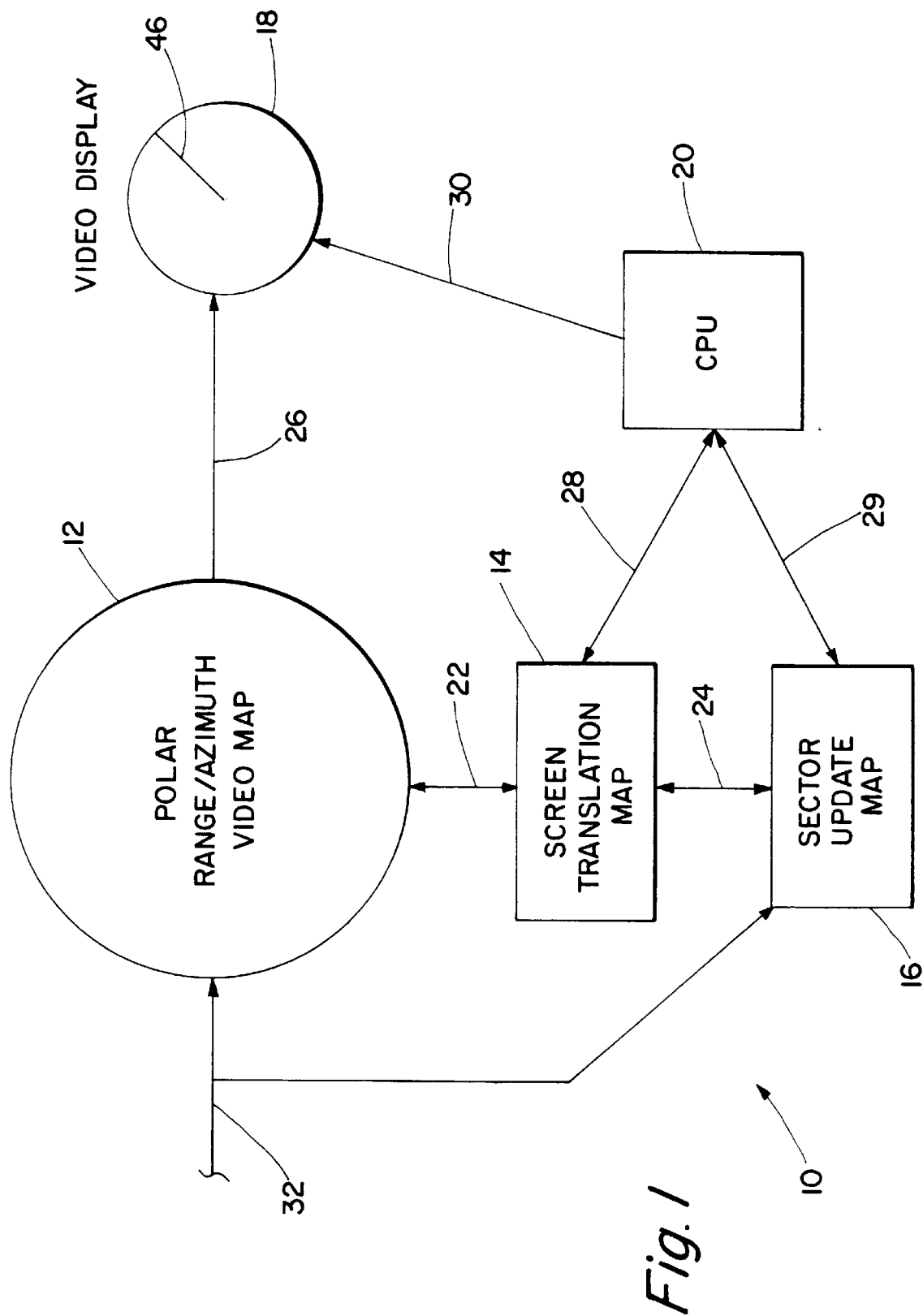
FIG. 1 is a block diagram of the Radar Scan Converter System of the present invention.

The new and improved basic radar scan converter system 10 in FIG. 1 includes four functional components: (1) range/azimuth video map 12, (2) screen translation map 14, (3) sector update map 16, and (4) video display 18. A central processing unit (CPU) 20 provides data calculating and processing capability for the radar scan converter system. These functional components of the radar scan converter system are electrically connected into the system by line 22, which interconnects the range/azimuth video map 12 and the screen translation map 14; by line 24, which interconnects the screen translation map 14 and the sector update map 16; and by line 26, which connects the screen translation map 14 to the video display 18. The CPU 20 is similarly interconnected to the screen translation map 14 and to the sector update map 16 by lines 28 and 29, respectively; and, to the video display 18 by line 30. It is contemplated that one or more of these lines 22, 24, 28, 29 and 30 could be on a conventional parallel bus.

The range/azimuth video map 12 collects range and azimuth data from a data stream generated by a conventional radar system (not shown) and supplied to the radar scan a converter system on radar input line 32. The range/azimuth video map 12 includes a memory that contains an $A_n$-by-$R_n$ radar video map where $A_n$ is the number of azimuth cells and $R_n$ is the number of range cells. The screen translation map 14 contains a chronological list of radar video map addresses for each pixel on the screen of the video display 18. The sector update map 16 contains the location in the screen translation map 14 for the start of each update sector and the number of pixels to be scanned in the sector to be updated. The video display 18 is responsive to the video information generated by the screen translation map 14 and displays this video information on a conventional computer display screen.

Additional description and operation of each of these functional components of the radar scan converter system 10 will be described hereinafter.

Range/azimuth video map 12

The range/azimuth video map 12 of the radar scan converter system 10 of FIG. 1 collects range and azimuth data from a data stream generated by a conventional radar system (not shown) and supplied to the radar converter system on radar input line 32. The range/azimuth video map stores this range and azimuth data in a polar coordinate map 34. The polar map 34 has a predetermined number of identical sectors, such as representative sector 36. Each sector has a predetermined number of range/azimuth cells, such as map cell 42. The area of any map cell is determined by its range position as measured outwardly from the polar map center 44. The polar map 34 has a predetermined number of identical sectors in the radar scan converter system 10 as herein described and shown. These identical polar map sectors commence with sector S1, having its leading sector boundary at 0°/N for North. Trace line 46, which here represents the 360° rotation of the conventional radar system antenna (not shown), moves in a clockwise direction from the 0°/N leading boundary of the first sector S1, through this sector S1, then sequentially through the fan of remaining identical adjacent sectors of the polar map 34, and back to 0°/N. The trace 46 then begins its movement through another 360° scan of the polar map; and, this continues with successive 360° scans. These scans continue at the discretion of an operator of the radar scan converter system 10.

The range/azimuth map 12 of FIG. 1 collects radar input signals via radar input line 32, and stores these radar signals in the proper range/azimuth cell of the polar map 34. For example, a radar input signal which represents a returned radar signal, which could be a moving target, is identified or "painted" in polar map sector S1 and map cell 42. Since there are usually more radar input signals or samples than range cells in the polar map 34, and more radar sweeps than azimuth cells, then the largest of all these radar input signals that fall within a cell, such as cell 42, remain for continued display by the video display 18 as will be described hereinafter.

The radar scan converter system 10 displays two kinds of video: analog and discrete. A conventional video mixer (not shown) combines analog and discrete videos into a single master video which is stored in the range/azimuth video map 12. The analog video is thresholded, i.e., a known value is selected, and any video above this selected threshold is scaled with any determinable linear or nonlinear function up to a known maximum value, which results in the determination of a value for the video map. The radar scan converter system 10 of FIG. 1 can process eight (8) discrete videos that are represented by a binary level of 0 or 1. However, it is contemplated that the number of discrete videos can be other than this example of eight (8). These eight (8) discrete videos are used as an address to a lookup table calculated by the CPU 20. This lookup table yields a video level for any and all combinations of the eight (8) discrete videos. A selected video level is then compared to the scaled analog level, and the larger value is entered into the video map. Typically, the discrete levels will be higher than the largest analog value so that the discrete video will always be displayed on top of the analog video. It is contemplated that each level of discrete video could have its own color palette in the video display 18 so that each level has a different color to distinguish one level from the other levels. For example, one level could have blue as a selected color; another level could have red; and yet another level could be yellow.

Figure 2:
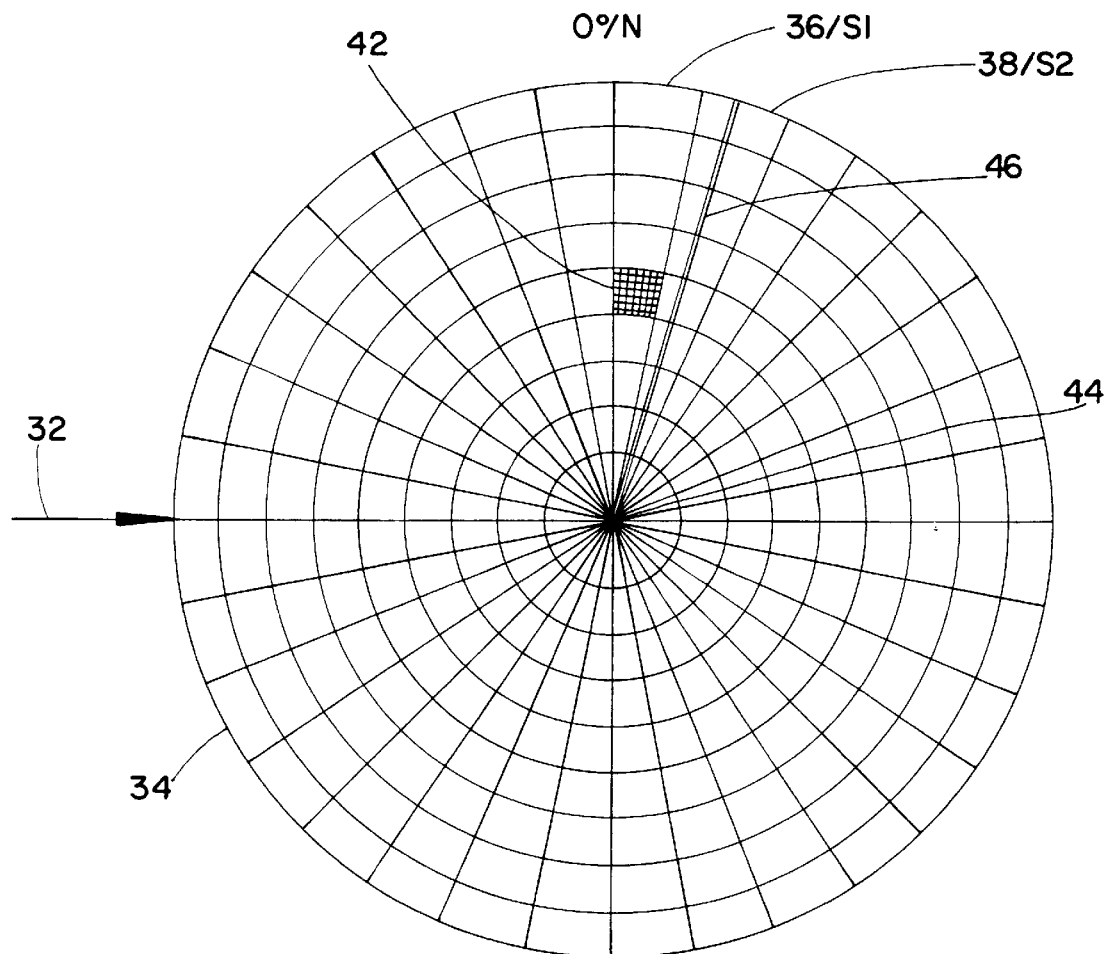
FIG. 2 is an enlarged plan view of the polar radar video map of FIG. 1.

The radar video memory map 34 of FIG. 2, when used in an operating radar scan converter system 10, contains a memory which stores the collected video levels for the input videos. The radar video memory has a memory capacity to store $A_n$ azimuth cells and $R_n$ range cells. Each radar video map cell, i.e., A,R, corresponds or maps to a determinable memory address which is calculated by the formula:

$$A \times R_n + R \qquad (1)$$

As the radar input signals are sampled, the address to the radar video memory map 34 is advanced utilizing a rate multiplier function which assures that the address will step uniformly through $R_n$ range cells after the maximum number of video samples in a radar sweep. The base address for the sweep is determined by the radar azimuth value at the beginning of the sweep. This azimuth value is used as an address to a lookup table memory that stores the starting address for every possible azimuth value. The data for this lookup table is generated by the CPU 20 to distribute the video map 12 around the entire 360° radar scan. The values in the lookup table memory begin at zero at the 0°/North azimuth, and are advanced by $R_n$ at the azimuth boundary of each new azimuth cell.

The range/azimuth video map 12 also performs the scan-to-scan decay of the radar video. The video that was left in the cell from the last scan is decayed using a decay lookup table. If the decayed video is larger than the new video, then the decayed video is put back into the cell instead of the new video. The first time a video map cell, such as cell 42, is updated in a scan, the existing memory content is decayed and then compared to the value of the new video. If the value of the decayed video is larger than the new video value, then the decayed video will be written back into the memory to be displayed in the new scan. In all successive samples that update video map cells, such as cell 42, the new video is compared directly to the memory contents with no decay, and the larger value is written back into the memory. The decay function is implemented by the decay lookup table, which is calculated by CPU 20 that specifies the decayed value for each possible existing video level. The discrete videos can use different video levels than the analog video so that the discrete videos can have their own decay algorithms for the decay lookup table.

Screen Translation Map 14

The screen translation map 14 of FIG. 1 contains a chronological list of video map addresses for each pixel on the screen of the video display 18. For purposes of a clear understanding of the radar scan converter system 10, the screen translation map 14 of FIGS. 1 and 4 will be described with the sector update map 16 of FIG. 3, both in view of FIG. 2, The screen translation map 14 contains an address of a range/azimuth video map cell for each pixel of the video display screen 18. These addresses are calculated by the CPU and loaded into a scan converter, which can be either in system hardware or in system software, to scan the video in the range/azimuth video map 12. The screen translation map 14 video map for display 18 is calculated using the polar dimensions of the range/azimuth map 12, the dimensions of the display screen 18, and the desired display offset position and range scale as parameters. The translation addresses are entered into the screen translation map 14 of FIG. 4 as a string of translations which are sequenced in the order that the pixels will be updated on the video display screen 18. The pixels are arranged in update sectors which correspond to identical sectors, such as sectors 36 and 38; hereinafter sometimes referred to as sectors S1 and S2, respectively. The rectangles of one sector butt up against or are contiguous with the corresponding rectangles in adjacent sectors. These abutting rectangles as defined across the several sectors, such as sectors S1 and S2, present a mosaic which permits a relatively smooth scan of the video map 12 yet which minimizes the amount of data that is processed by the CPU 20. When a pixel is scanned, the selected pixel's screen translation address, i.e., its X, Y coordinates translated to polar range/azimuth coordinates, is sent to the range/azimuth video map 12. This address is used to access the video for the scanned pixel, and the video level for this scanned pixel is then sent to the display 18 where it is written on the display screen. Since every pixel is translated to a range/azimuth cell, the result is a spokeless display.

Figure 3:
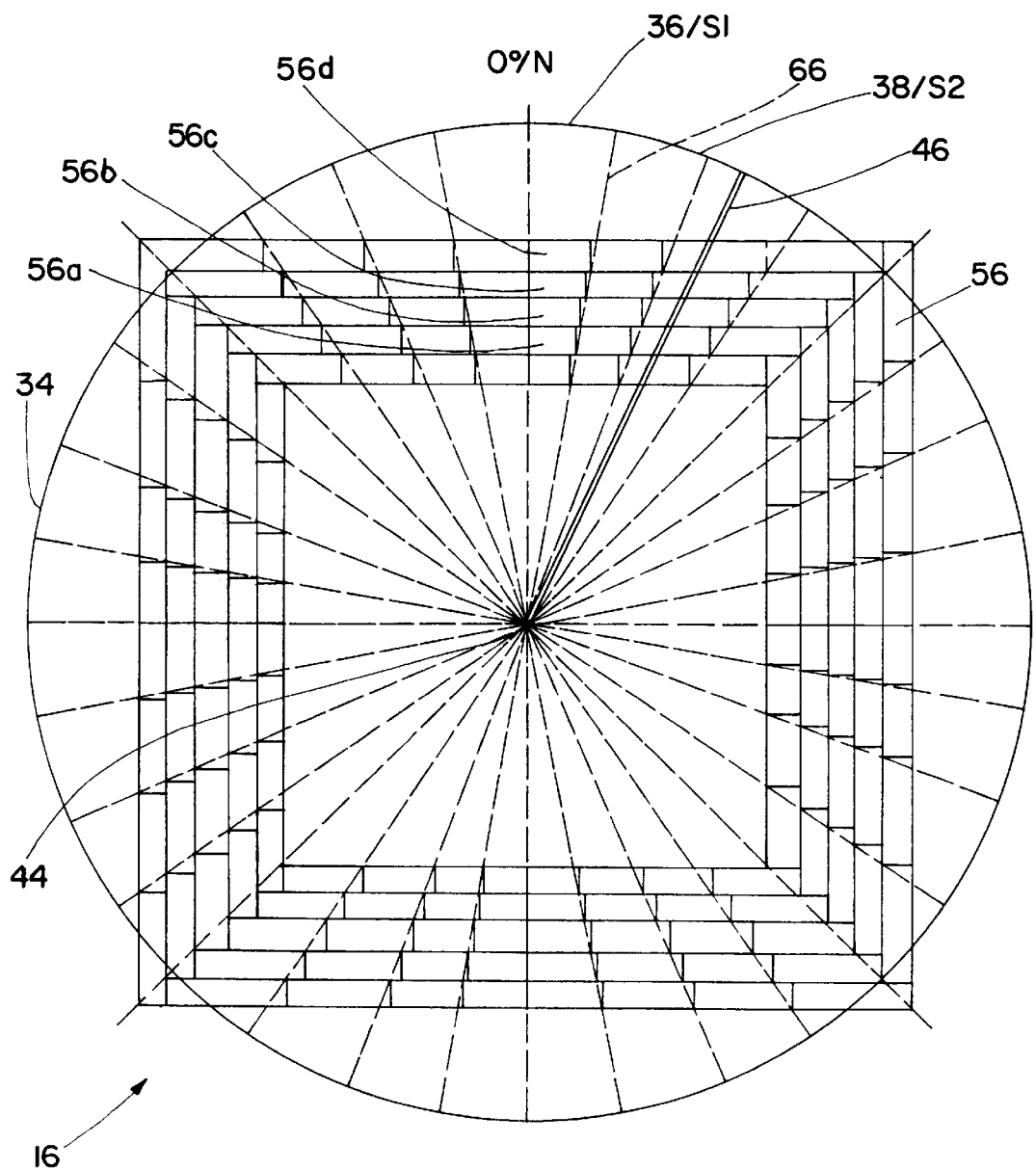
FIG. 3 is a schematic plan representation of an example of one output by the screen translation map of FIG. 1 to the range/azimuth video map of FIG. 1.

Since the screen of the video display 18 of the radar scan converter system 10 is preferably rectangular, there is system efficiency in scanning a selected update sector through use of a series of relatively small and similar rectangles 56 that cover the update sector. For example, sector 36 has a number of similar rectangles 56a, 56b, 56c and 56d defined thereon. These similar rectangles in update sector 36 are butted against or contiguous with other similar rectangles in adjacent sectors, such as sector 38, as shown by FIG. 3. An algorithm is used to create the similar rectangles, such as rectangles 56a, 56b, 56c and 56d, for update sector 36. The algorithm starts at 0°/North, which is oriented at the top of the polar map 34 and video display 18. A selected number of equally spaced horizontal lines are created in the Y-axis which define the top and bottom sides of the rectangles. The X-axis for each rectangle 56 is calculated by finding the intersection of each horizontal line with the boundaries of the update sectors, such as sectors S1 and S2. This is completed for each update sector up to 45 degrees. Starting at 45° and continuing to 135°, equally spaced vertical lines define the left and right sides of the rectangles. The Y-axis for each rectangle 56 is calculated by finding or locating the intersections of the sector boundaries with the vertical lines. At and above 135°, the process continues again using equally spaced horizontal lines. This continues until the last update sector has been created. Any rectangle that is completely off-of-the-screen, or that is completely outside the maximum range of the range/azimuth video map, is eliminated. Any rectangle that is partially offscreen is cropped to the associated edge of the polar map screen 34.

It is contemplated that the rectangles 56 could also be oriented along the sector boundaries rather than across the sector boundaries as described above. It is further contemplated that the value of the smaller dimension of a rectangle could be made to equal one (1) so that each rectangle would then become either vertical or horizontal lines.

Figure 4:
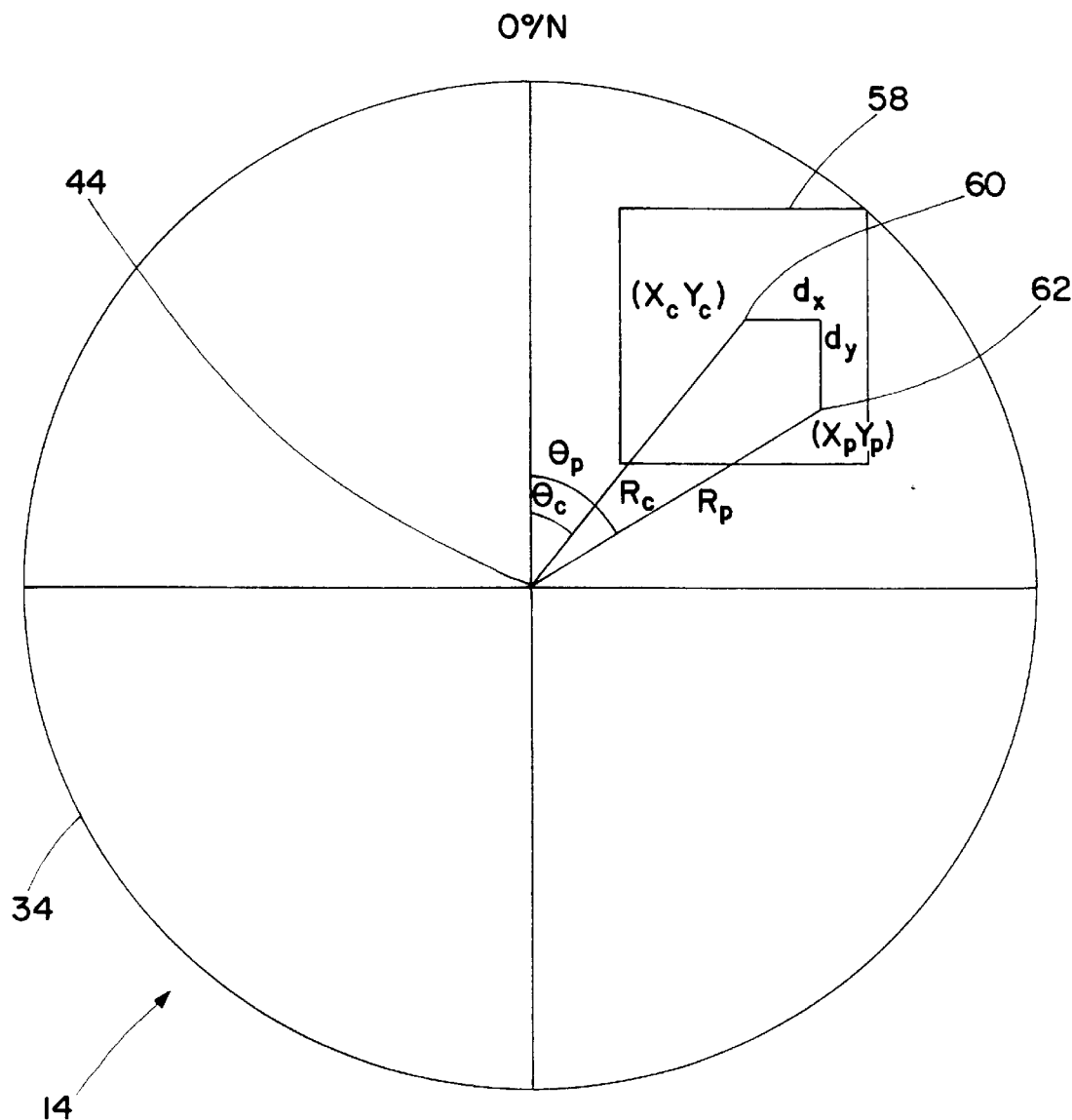
FIG. 4 is a schematic plan representation of an example of one output by the sector update map of FIG. 1 to the range/azimuth video map of FIG. 1.

Referring to FIG. 4 in view of FIG. 3, the translation addresses are organized by update sectors in the screen translation map 14. Within an update sector, such as sector S1, the translation addresses are listed in the order that the pixels are updated on the display screen 18. The rectangles 56 are updated outward from the polar map center 44, and each rectangle is updated from upper left to lower right on the video display 18 which conforms to a conventional computer raster scan display.

The translation addresses are calculated by the CPU 20 using both the range and azimuth offset, and the range scale of the video display screen 18 as parameters. When the video display is expanded, the screen is actually contracted relative to the range/azimuth video map 12. In FIG. 4, such a contracted screen is then moved to an offset area 58 determined by the now offset center 60 of the video screen 18; for example, the Cartesian coordinates of center 60 are $X_c, Y_c$ in the range/azimuth video map 12 of FIG. 4. It is now necessary to determine the polar location of each pixel in the video screen 18 for this contracted screen at the offset point having its center at 60. Thus, the calculation of the range/azimuth map coordinate $(R_p, \emptyset_p)$ for a designated screen pixel 62 (dx, dy), where the center 60 of the screen is offset to a selected point $(R_c, \emptyset_c)$, is calculated by the CPU 20 as follows:

$$X_c = R_c \sin \emptyset_c \quad Y_c = R_c \cos \emptyset_c$$

$$X_p = X_c + dx \quad Y_p = Y_c + dy$$

$$\emptyset_p = \tan^{-1}(X_p/Y_p) \quad R_p = (X_p^2 + Y_p^2)^{1/2} \quad (2)$$

Sector Update Map 16

Referring to FIGS. 2 and 3, again in view of FIG. 1, the sector update map 16 contains the location in the screen translation map 14 for the start of each update sector, and the number of pixels in a selected sector to be scanned when updated by the radar scan converter system 10.

The sector update map 16 is responsive to the polar position of the radar azimuth as represented by the trace line 46. The radar azimuth scans across a sector which is to be updated, such as sector S1 of polar map 34. The scan continues over the sector S1 boundary 66, and into the adjacent sector S2. When the scan crosses the sector S1 boundary 66, the sector update map 16 signals or tasks the screen translation map 14 to scan sector S1. Each pixel translation address is sent to the range/azimuth map 12 which looks up the respective video level, and then sent to the video display 18. The resulting video scan of sector S1 is appropriately displayed by video display 18. Thus, the radar video display 18 is sequentially updated by azimuth sectors.

The sector update map 16 contains the starting address in the screen translation map 14 and the number of pixels for each update sector, such as sector S1. A sector is updated, first, by loading the starting address into an address counter, and then, loading the number of pixels into a pixel counter. Each of these pixels are scanned, and both of the counters are advanced until the pixel counter has counted down to zero (0). The sector update map 16 further contains the locations and dimensions of each rectangle, such as one of the similar rectangles 56, in the sector S1 which is herein described as being updated.

Therefore, after an update sector boundary, such as sector S1 boundary 66 has been passed and the sector video has been scanned by video map 12, a signal is sent by the sector update map 16 to the video display 18 indicating that the sector S1's video is ready for display. The display process then accesses the sector rectangle coordinates and the rectangle video, and transfers the video to the display screen 18.

Video Display 18

Referring to FIG. 1 in view of FIG. 3, the video display 18 operates in conjunction with the sector update map 16 to display each sector's video, such as that of sector S1, as it is scanned by the sector update map. The video display 18 first gets the dimensions of a selected update rectangle (one of the similar rectangles 56) from the sector update map 16, and next gets the video to be filled into the selected rectangle from the range/azimuth video map 12 as it is scanned by the screen translation map 14. When all of the rectangles in the sector that is to be filled, here sector S1, have been scanned, the screen of the video display 18 will have been loaded with all of the video in the sector.

After the video has been loaded successively onto each sector of the screen, the video display 18 is responsible for decaying the video during the scan before each sector is updated in the next scan. The display process then accesses the sector rectangle coordinates and the rectangle video and transfers the video to the display screen. In its simplest form, the display allocates some number of color palette entries to the analog video, some to the discrete video, and the rest to symbolic and map information. The colors to be displayed for each palette entry are determined by the color palette resident in the display hardware.

This desired decay of the video is accomplished through color palette rotation. A color scale table is rotated through a display palette at regular intervals during the known period of a 360° scan by the trace line 46. This has the effect of reducing the color scale level on any video that has already been loaded onto the video display screen 18. Any new video that is loaded onto the screen will be displayed at its full intensity but it will immediately start to decay as the display palette continues to rotate. On the next scan, the range/azimuth video map 12 will decay any old video that was in the map by the same amount that the rotating color palette decayed it during the scan so it will appear as the same color intensity or gray level after it is updated.

Figure 5:
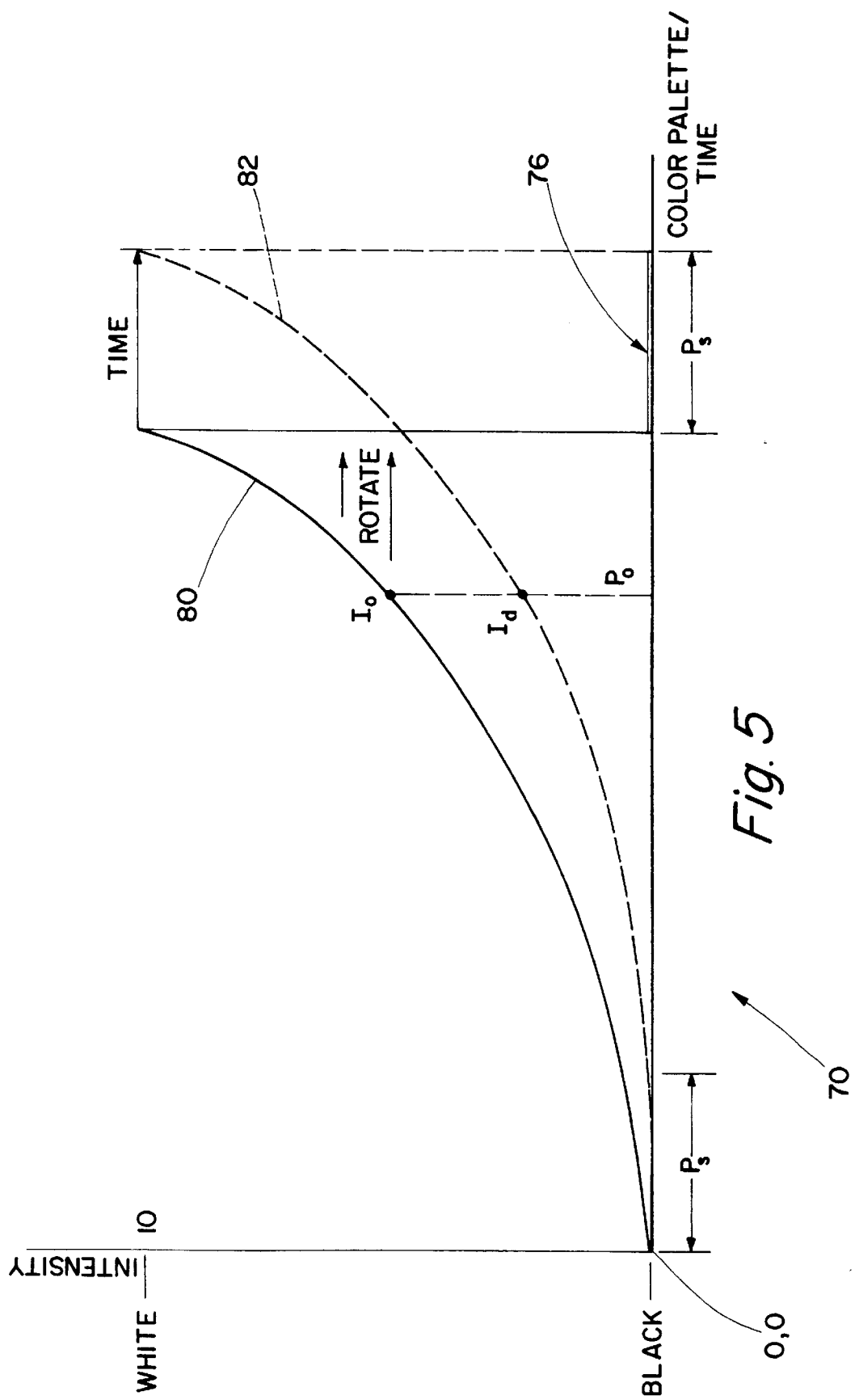
FIG. 5 is a graphic example of one rotating color palette for the video display of FIG. 1.

Referring to FIG. 5, one example of a rotating color palette 70 for the video display 18 is graphically illustrated, and it will be described as one operational sequence of the radar scan converter system 10.

Figure 6:
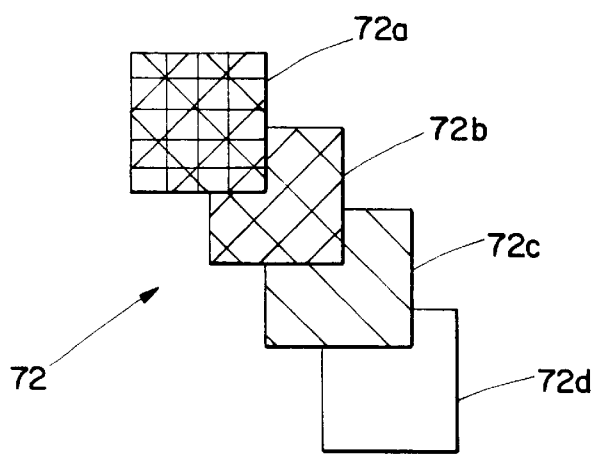
FIG. 6 is a schematic representation of a moving target with a decay trail as a product of the rotating color palette of FIG. 5.

The rotating color palette 70 has the number of palettes per scan (where one scan is equivalent to one 360° sweep by the trace line 46 across the polar map 34 of FIG. 2) as a function of time on the X-axis. The Y-axis scales color intensity or gray level from an absence of color or black (at 0,0 on the X- and Y- coordinates) to a maximum intensity value of white (which can be arbitrarily scaled at 0,10). An image 72a (see FIG. 6) painted in polar sector 36 of map cell 38, as described with reference to FIG. 2, during a given 360° scan (Scan One) of the trace line 46 visually represents a reflected radar signal of a moving target. The color palette $P_o$ for image 72 has an initial intensity ($I_o$) as located on curve 80 of FIG. 5. The elapsed time between Scan One and the next 360° scan (Scan Two) is scaled on the X-axis as $P_s$, which is the elapsed time for a determinable number of palettes per scan ($P_s$). The resultant decay in palette intensity ($I_d$) is that decay as scaled on the Y-axis from $I_o$ on curve 80 to $I_d$ on phantom curve 82. Image 72b in FIG. 6 shows this resultant decay intensity from $I_o$ to $I_d$. The continued rotation of the color palettes results in further decayed intensity of image 72b through intensity levels resulting in continued decaying images 72c and 72d. This decay of target image 72 from 72a to 72d emulates the trail of decayed images left behind a moving target as normally viewed on a radar range/azimuth map 12 of FIG. 1. It is contemplated that the number of images to reflect the decaying trail of a moving target could be greater than or less than those as shown by FIG. 6 and as described above.

It is further contemplated that a more sophisticated display could have separate color palettes for the radar video and the symbology. This would provide increased flexibility with the symbolic information, and allow increased combinations of gray and color scales for the video display 18. The extra color scale levels and palette locations would allow the display to decay the video on the screen between scans without having to write new video levels into the display memory.

All of the foregoing is done through color palette rotation. Restating, the color palette is loaded with a gray scale table that goes from black to white over some number of palette locations $P_s$ shown by FIG. 5. Any video level that is loaded into the video display 18 will have the intensity specified by the color table at the palette location indicated by its video. After the video has been loaded into the display, the color palette is rotated to the right with reference to the X-axis at regular intervals during a scan. Each time it is rotated, the intensity level for the video previously loaded into the display memory will be reduced. In order to keep new video from being decayed along with old video, the present palette value of the base of the gray scale table is added to the new video. This results in the desired decay of old video, while new video will come in or be "painted" at fill intensity.

On the next scan, the existing video in the range/azimuth video map 12 is decayed by subtracting the number of rotated palette locations $P_s$ from the video level in the map. Since the base of the gray scale table in the palette has been rotated up to $P_s$, the display will add $P_s$ back into the decayed video; the actual palette number will remain the same; and, the intensity of the decayed video after the refresh will be exactly the same as before the refresh. Thereafter, it will continue to decay as the gray scale table continues to rotate through the color palette.

There is one requirement in the use of color palette rotation with the radar scan converter system 10 of the invention. As shown in FIG. 5, a black zone of $P_s$ palette locations is provided so that a black video input that is loaded at the base of the gray scale table in the palette will continue to be black as the palette rotates. Without the black zone, an intended black pixel would suddenly become white before the pixel is refreshed during the next scan.

AS WILL BE EVIDENCED from the foregoing description of the preferred embodiment, certain aspects of the Radar Scan Converter System of the present invention are not limited to the particular details of construction or of function as described and illustrated. It is contemplated by the inventors that other applications and modifications of their invention will occur to those having skill in the art where the invention finds particular use. However, it is intended that the Claims shall cover all such applications and modifications which do not depart from the broad scope and true spirit of the invention as has been herein described and illustrated.

We claim:

1. A radar scan converter system, which receives a polar coordinate data stream generated by a conventional radar system and processes range and azimuth data from the data stream, comprising:

a) a range/azimuth video map means to collect and store the range and azimuth data as video inputs to a range/azimuth polar video map having a predetermined number of sectors with each sector having a selected number of range/azimuth cells, b) a video screen display having a plurality of pixels organized in the X- and Y- axes of a Cartesian coordinate system, c) a screen translation map means to read a video value from said video map means for a selected one of a chronological list of video map addresses contained in said screen translation map means each of which corresponds to the location of a respective one of said plurality of video screen display pixels, d) a sector update map means to identify the address location in said screen translation map means for the start of an update scan of at least a selected one of said sectors and the number of pixels and address of every pixel to be updated in said sector, and e) a central processing unit means to selectively control each of said range/azimuth video map means, video screen display, screen translation map means, and sector update map means.

2. The system of claim 1 in which said display pixels are arranged in a row-and-column orientation within a viewing area defined by the dimensions of said video screen.

3. The system of claim 2 in which said dimensions are aligned with the X- and Y- axes of the Cartesian coordinate system as a rectangular video screen display.

4. The system of claim 3 in which said X-axis represents range/sweep data and said Y-axis represents azimuth/scan data.

5. The system of claim 1 in which said sector update map contains a location in said screen translation map for the number of said pixels to be both scanned and updated responsive to the range and azimuth data of the data stream supplied to said radar scan converter system.

6. The system of claim 3 in which said sectors are identical.

7. The system of claim 6 in which each one of said range/azimuth cells in a selected one of said identical sectors defines an area dissimilar to said remaining cells in said identical sector.

8. The system of claim 6 in which said range/azimuth cells include a predetermined number of said azimuth cells ($A_n$) and of said range cells ($R_n$).

9. The system of claim 8 in which respective ones of said range and azimuth data having values greater than prior range and azimuth data are stored in an associated cell of a selected one of said sectors.

10. The system of claim 8 in which said $A_n$ cells are scaled along an X-axis, and said $R_n$ cells are scaled along a Y-axis as Cartesian coordinates.

11. A method for operating a radar scan converter system that receives range and azimuth data generated by a conventional radar as presented in a polar coordinate system, stores this data in associated cell locations in a range/azimuth polar video map, and displays this polar coordinate range/azimuth data in a Cartesian coordinate system, in real time, on a conventional computer monitor having a rectangular display formed by a relatively large number of pixels organized in the Cartesian coordinate system, the method comprising the steps of:

a) selecting a pixel in the display for sequential updating,
   b) locating a respective address for said pixel,
   c) determining the corresponding range/azimuth cell address in the polar video map,
   d) reading the video level in said corresponding range/azimuth cell, and
   e) either initially loading or subsequently updating said pixel with said video level.

12. The method of claim 11 in which said step of selecting includes every pixel in the display, and said step of reading further includes the steps of determining respective values of associated range and azimuth data from the data generated by the conventional radar, and storing said range and azimuth data in said range/azimuth cell when said data has a value greater than a prior range and azimuth value stored in said cell.

13. The method of claim 12 in which said value is determined by a decay lookup table of values by said video map.

14. The method of claim 13 in which said value is determined subsequent to each of said scans of the radar system.

15. The method of claim 14 in which the polar video map includes a predetermined number of sectors having a selected number of range/azimuth cells for each of said sectors wherein said determination is subsequent to a complete scan of a designated sector.

16. The method of claim 15 in which each scan of the radar system encompasses a plurality of said identical sectors for a total of 360° as a complete scan.

17. The system of claim 3 in which a selected sector for said update has each one of a plurality of similar rectangles substantially contained within said sector.

18. The system of claim 17 in which said rectangles are contiguous with each other within said sector.

19. The system of claim 18 in which a first of said rectangles adjoins a polar center of said 360° polar coordinate map, and a last of said rectangles lies adjacent and cropped to the arc of said sector.

20. The method of claim 16 in which a selected sector has each one of a plurality of similar rectangles substantially contained within the sector wherein updating of a selected sector is a periodic scan that progresses outwardly from a polar center in the polar coordinate system through a first and each successive rectangle to and including the last of the sector's rectangles.

21. The method of claim 20 in which said scan of each of said rectangles progresses from upper left to lower right with reference outwardly from said polar center.

22. The system of claim 19 in which said sector update map contains a location address in said screen translation map of each of said pixels, and said pixels are updated in a predetermined order as said scan progresses through said selected sector.

23. The system of claim 19 in which said video screen display includes first means for color palette rotation to decay the color intensity of said visible trail of successive radar images by a predetermined amount with each rotation of a color scale table by said means.

24. The system of claim 23 in which said video screen display includes at least a second means for color palette rotation where said first and second means use existing video levels to develop increased combinations of gray and color scales for said video screen display.

25. The system of claim 23 in which said first means of color palette rotation includes a black zone to maintain a selected pixel as having a black intensity prior to an update of said pixel so that said selected pixel does not intermittently exhibit a white intensity prior to the update.

26. A method for operating a radar scan converter system that receives range and azimuth data generated by a conventional radar as presented in a polar coordinate system, stores this data in associated cell locations in a range/azimuth polar video map, and displays this polar coordinate range/azimuth data in a Cartesian coordinate system, in real time, on a conventional computer monitor having a rectangular display formed by a relatively large number of pixels organized in the Cartesian coordinate system, the method comprising the steps of:

a) combining analog and discrete video signals, b) storing said combined video signals in a range/azimuth video map, c) thresholding the values of said analog video signals with reference to a predetermined value where the analog level of a selected one of said analog video signals is assigned a scaled analog level, d) determining by said thresholding step a respective value for an associated one of said analog video signals for display, e) maintaining a lookup table that includes a video level for a selected one of said discrete video signals, f) comparing the video level for said selected one of said discrete video signals to said scaled analog level for said selected associated one of said analog video signals, and g) entering the larger of said video levels of said analog and discrete video signals for video screen display.

27. The method of claim 26 which said maintaining step includes a video level for a selected combination of said discrete video signals.

* * * * *